United States Patent [19]

Shigeeda et al.

[11] Patent Number: 5,341,223
[45] Date of Patent: Aug. 23, 1994

[54] HEIRARCHICAL INDICATION INCLUSIVE INDICATION AND HEIRARCHICAL INCLUSIVE INDICATION INPUT SYSTEM

[75] Inventors: Nobuyuki Shigeeda; Susumu Yamamoto; Masahiko Katsurabayashi; Tadahiko Ikegaya, all of Saitama, Japan

[73] Assignee: Fuji Xerox Co., Ltd., Tokyo, Japan

[21] Appl. No.: 70,037

[22] Filed: Jun. 1, 1993

Related U.S. Application Data

[63] Continuation of Ser. No. 598,009, Oct. 11, 1990, abandoned.

[30] Foreign Application Priority Data

Apr. 10, 1990 [JP] Japan .................... 2-93049

[51] Int. Cl.⁵ .................... H04N 1/00; G06F 9/00
[52] U.S. Cl. .................... 358/440; 358/400; 395/155; 395/160
[58] Field of Search ............... 358/400, 434, 438, 440, 358/468; 379/100; 340/712; 395/150, 156, 160, 161

[56] References Cited

U.S. PATENT DOCUMENTS

| | | |
|---|---|---|
| 4,086,443 | 4/1978 | Gorham et al. |
| 4,455,619 | 6/1984 | Masui et al. ............ 395/160 |
| 4,613,946 | 9/1986 | Forman .................. 395/160 |
| 4,703,412 | 10/1987 | Cunningham et al. |
| 4,821,211 | 4/1989 | Torres .................. 395/160 |
| 5,224,209 | 6/1993 | Hirai et al. ............ 395/150 |

FOREIGN PATENT DOCUMENTS

| | | |
|---|---|---|
| 0159400B1 | 10/1985 | European Pat. Off. |
| 0227327 | 7/1987 | European Pat. Off. |
| 53-148911 | 12/1978 | Japan .................... 358/440 |
| 2156186 | 10/1985 | United Kingdom. |
| 2227625 | 8/1990 | United Kingdom. |

OTHER PUBLICATIONS

Die Computer Zeitung, Jan. 5, 1983.

Primary Examiner—Edward L. Coles, Sr.
Assistant Examiner—Thomas D. Lee
Attorney, Agent, or Firm—Finnegan, Henderson, Farabow, Garrett & Dunner

[57] ABSTRACT

An indication input system for use in with facsimile machines and similar devices. The input system having a coordinate input device which displays an organizational chart expressing the relationship of a plurality of functions, and registers the coordinates of a point when indicated on the organizational chart, a memory for storing a data table including the plurality of functions, a plurality of key domains which define the coordinate boundary of each function, and related data which defines the relationship between the plurality of functions as expressed on said organizational chart, and a controller which determines which functions have been selected when a point is indicated on the coordinate input means, and sequentially effects the execution of the selected functions and the functions related to the selected functions.

41 Claims, 17 Drawing Sheets

FIG. 2

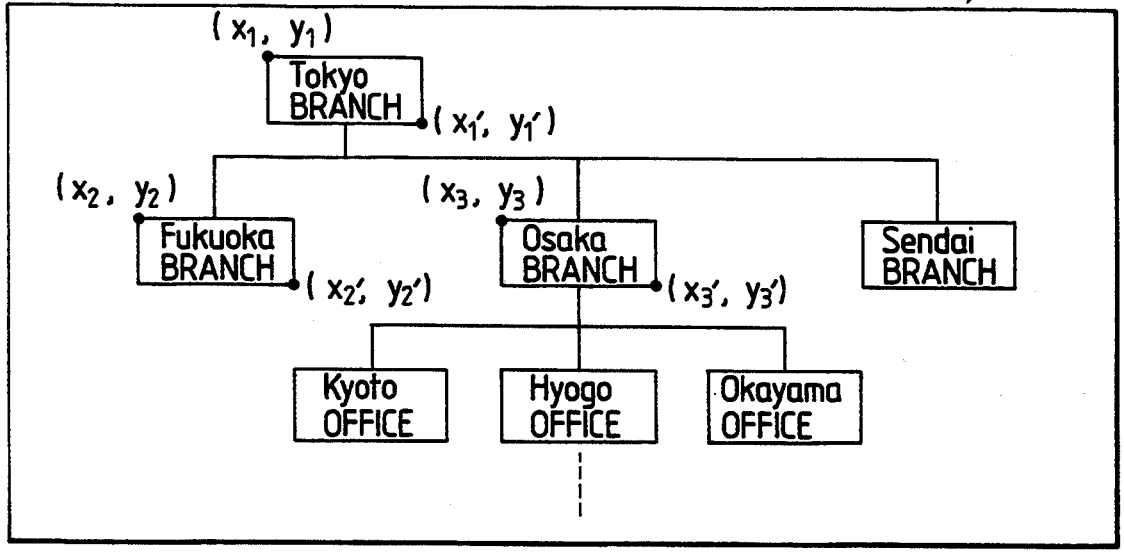

FIG. 3

| KEY DOMAIN | KEY NO. | DESIGNATION | RELATED MEMORY | TEL. NO. |
|---|---|---|---|---|
| $\begin{pmatrix} x_1, y_1 \\ x_1', y_1' \end{pmatrix}$ | 1 | Tokyo | 2  3  4  TERMINATION CODE | xx-xxx-xxxx |
| $\begin{pmatrix} x_2, y_2 \\ x_2', y_2' \end{pmatrix}$ | 2 | Fukuoka | 0 | xxx-xxx-xxxx |
| $\begin{pmatrix} x_3, y_3 \\ x_3', y_3' \end{pmatrix}$ | 3 | Osaka | 5  6  7  TERMINATION CODE | xx-xxx-xxxx |
| $\begin{pmatrix} \text{------} \\ \text{------} \end{pmatrix}$ | 4 | Sendai | 0 | xxx-xxx-xxxx |
| $\begin{pmatrix} \text{------} \\ \text{------} \end{pmatrix}$ | 5 | Kyoto | 0 | xxx-xx-xxxx |
| $\begin{pmatrix} \text{------} \\ \text{------} \end{pmatrix}$ | 6 | Hyogo | 0 | xxx-xx-xxxx |
| $\begin{pmatrix} \text{------} \\ \text{------} \end{pmatrix}$ | 7 | Okayama | 0 | xxx-xx-xxxx |
| ⋮ | ⋮ | ⋮ | ⋮ | ⋮ |
| $\begin{pmatrix} x_n, y_n \\ x_n', y_n' \end{pmatrix}$ | n |  | a [n] [ ] | xxx-xx-xxxx |

MAXIMUM SIZE OF RELATED MEMORY

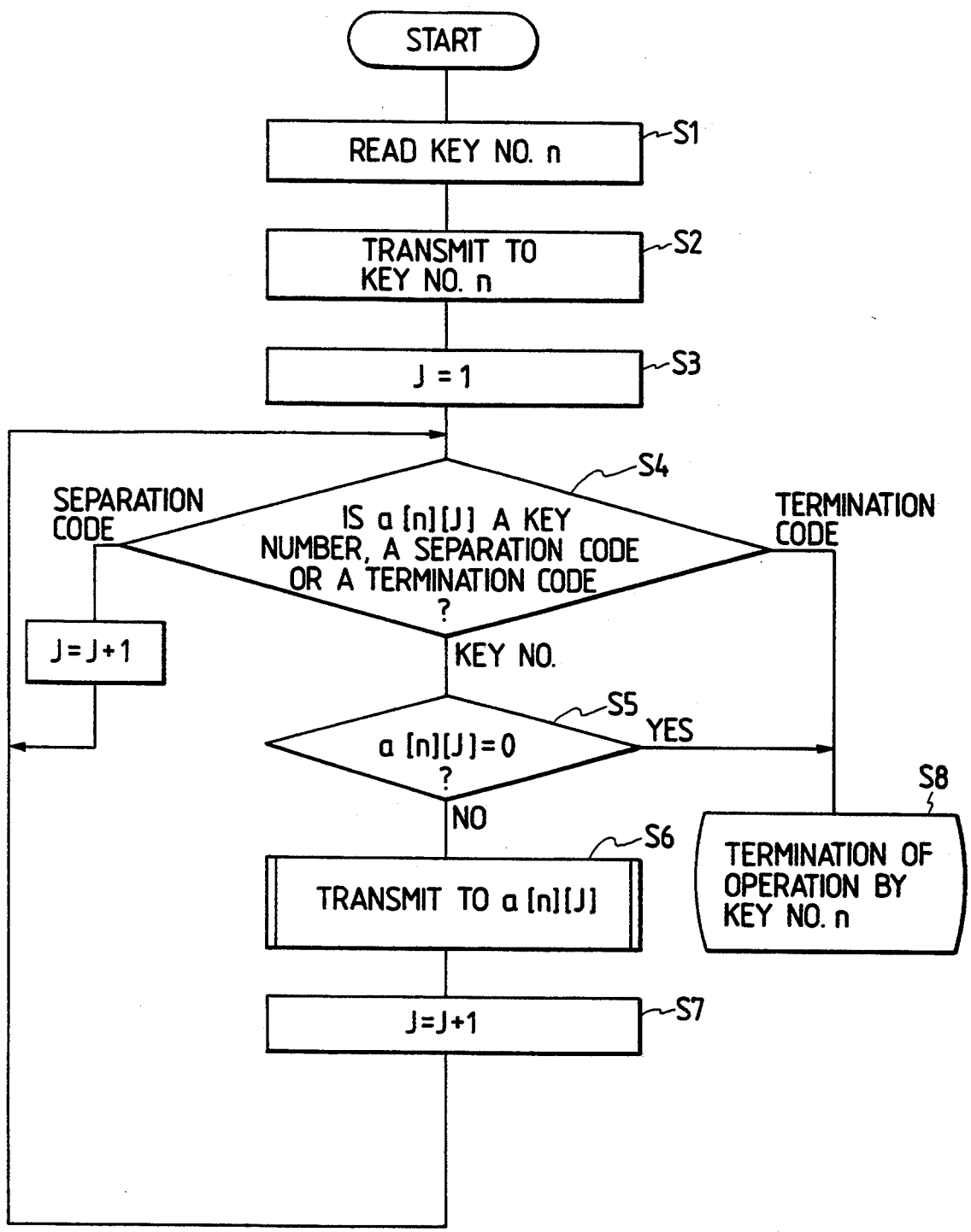

| KEY DOMAIN | KEY NO. | DESIGNATION | RELATED MEMORY | TEL. NO. |
|---|---|---|---|---|
| ( ) | 1 | A | 2 \| 3 \| 4 \| TERMINATION CODE | 0 |
| ( ) | 2 | Fukuoka | 0 | xx-xxx-xxxx |
| ( ) | 3 | Osaka | 0 | xx-xxx-xxxx |
| ( ) | 4 | Sendai | 0 | xxx-xxx-xxxx |
| ( ) | 5 | B | 6 \| 7 \| 8 \| TERMINATION CODE | 0 |
| ( ) | 6 | Osaka | 0 | xxx-xxx-xxxx |
| ( ) | 7 | Kyoto | 0 | xx-xxx-xxxx |
| ( ) | 8 | Nagoya | 0 | xxx-xxx-xxxx |

| KEY DOMAIN | KEY NO. | DESIGNATION | RELATED MEMORY | TEL. NO |
|---|---|---|---|---|
| ( ) | 1 | A | 2 3 4 5 TERMINATION CODE | 0 |
| ( ) | 2 | Osaka | 2 | xxx-xx-xxxx |
| ( ) | 3 | Fukuoka | 0 | xxx-xx-xxxx |
| ( ) | 4 | Kyoto | 0 | xxx-xx-xxxx |
| ( ) | 5 | Nagoya | 0 | xxx-xx-xxxx |

| KEY DOMAIN | KEY NO. | DESIGNATION | INCLUSIVE MEMORY | | | TEL. NO. |
|---|---|---|---|---|---|---|
| ( ) | 1 | Fukuoka | 0 | | | xxx-xx-xxxx |
| ( ) | 2 | Osake | 0 | | | xxx-xx-xxxx |
| ( ) | 3 | Sendai | 0 | | | xxx-xx-xxxx |
| ( ) | 4 | Kyoto | 0 | | | xx-xxx-xxxx |
| ( ) | 5 | INCLUSIVE | 2 | 4 | TERMINATION CODE | 0 |

| KEY DOMAIN | KEY NO. | DESIGNATION | OVERLAPPING MEMORY | | | TEL. NO. |
|---|---|---|---|---|---|---|
| ( ) | 1 | Osaka | 0 | | | xxx-xxx-xxxx |
| ( ) | 2 | Nagoya | 0 | | | xxx-xxx-xxxx |
| ( ) | 3 | OVERLAPPING | 1 | 2 | TERMINATION CODE | 0 |
| ( ) | 4 | Kyoto | 0 | | | xxx-xx-xxxx |

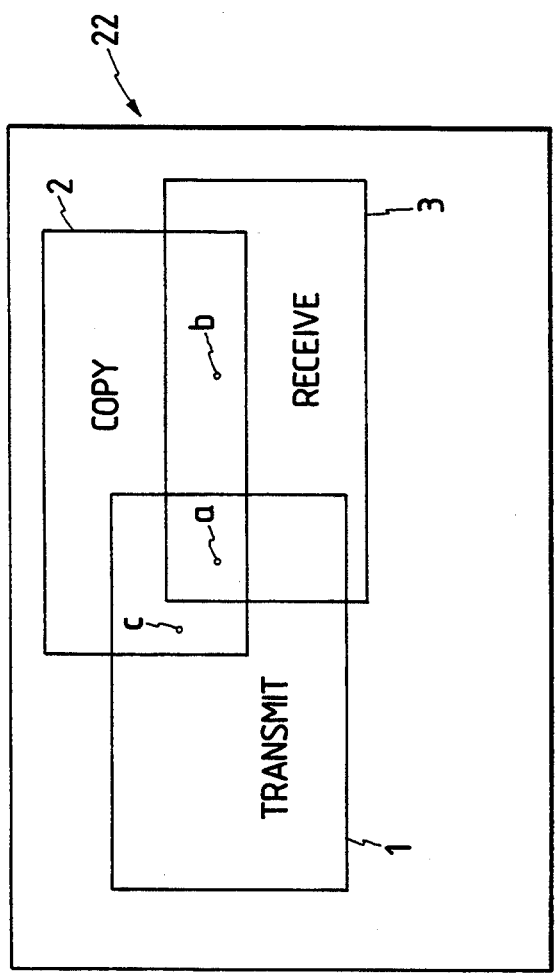

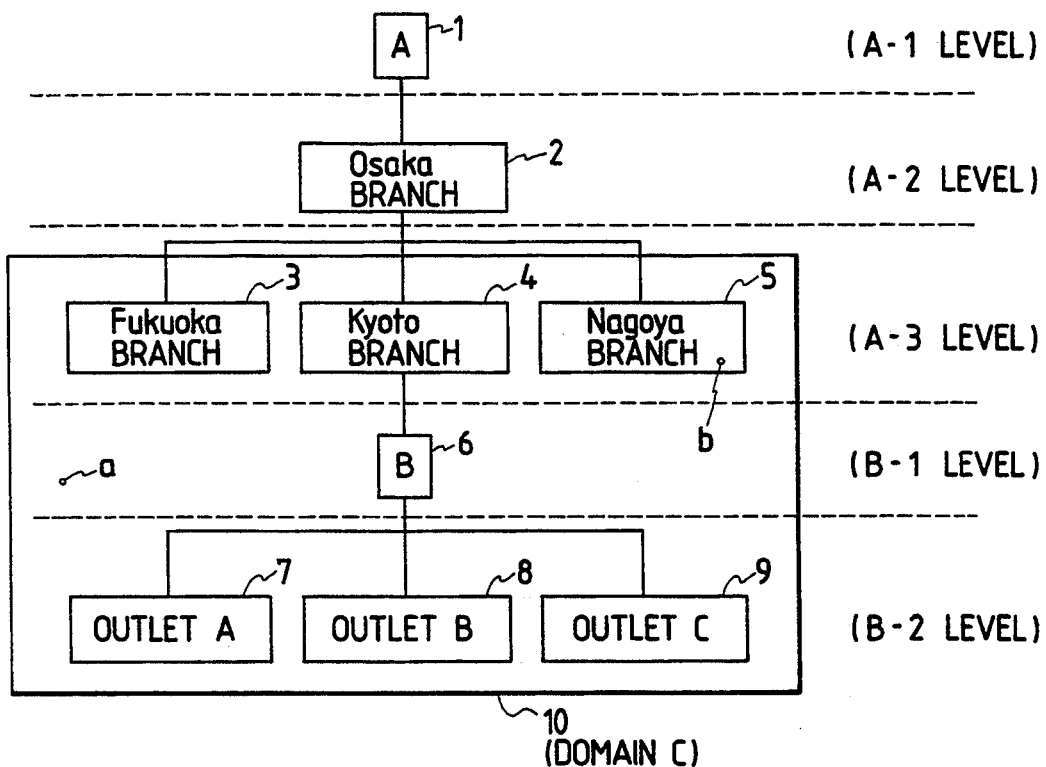

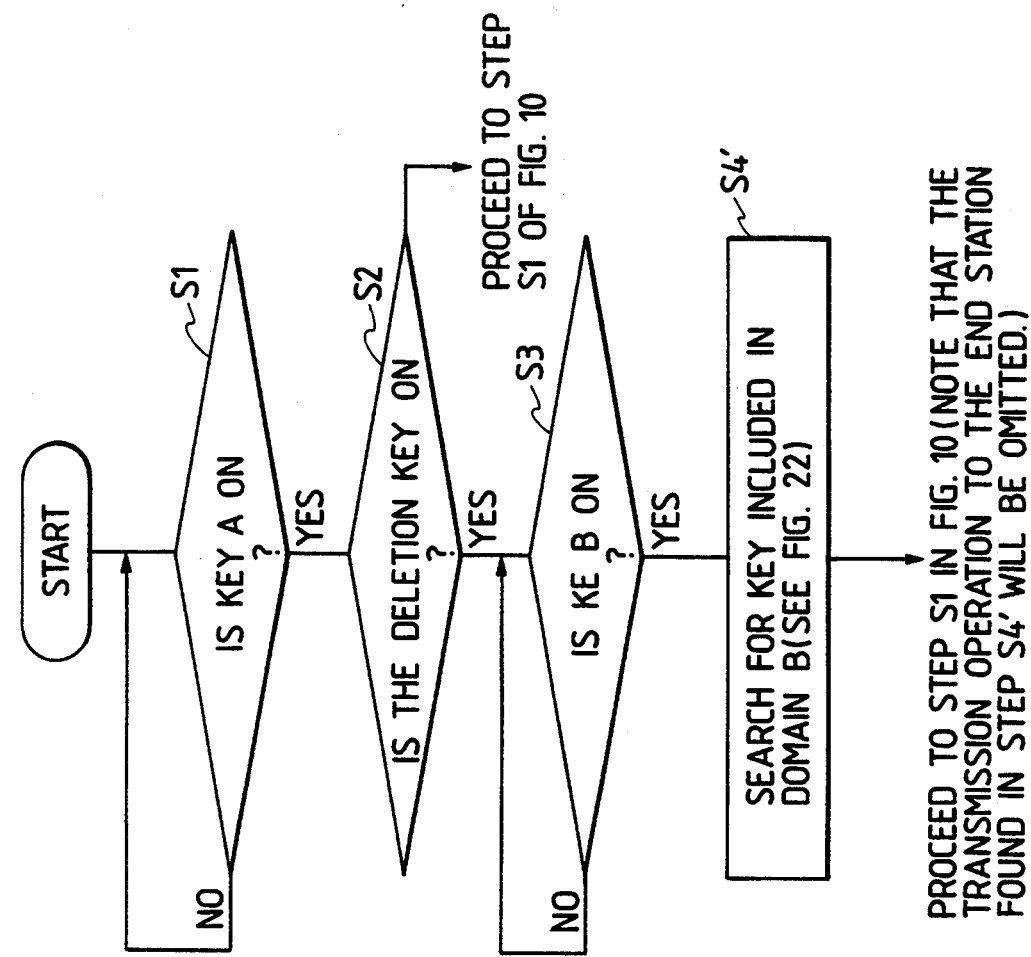
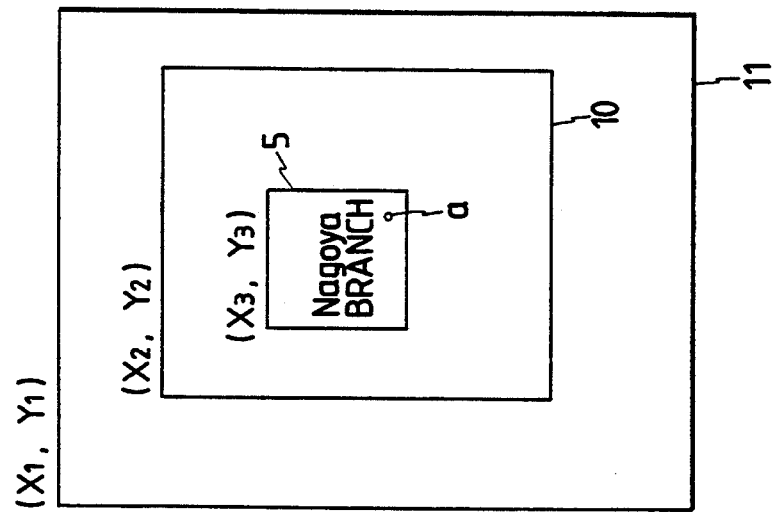

HEIRARCHICAL INDICATION INCLUSIVE INDICATION AND HEIRARCHICAL INCLUSIVE INDICATION INPUT SYSTEM

This application is a continuation of application Ser. No. 07/598,009, filed Oct. 11, 1990, now abandoned.

BACKGROUND OF THE INVENTION

1. Field of the Invention

This invention relates to hierarchical indication, inclusive indication and hierarchical inclusive indication input systems, and relates in particular to hierarchial indication, inclusive indication and hierarchical inclusive indication input systems which, using a coordinate input device, can systematically carry out call destination indications, function indications or the like in a facsimile machine or a similar apparatus.

2. Discussion of the Related Art

Conventional facsimile machines are able to carry out individual transmission, multi-station transmission, and relayed multi-station transmission or the like.

Individual transmission is, as is known, a system whereby manuscript information or the like is transmitted by indicating the call destination through the operation for example of an abbreviated dial key or a one-touch key programmed in advance with the telephone number of the station being called.

Multi-station transmission is a system whereby manuscript information or the like is transmitted either by indicating a plurality of call destinations through a plurality of inputs from abbreviated dial keys or one-touch keys programmed with the telephone number of the call station, or by indicating a plurality of call destinations through the operation of a special key which has been programmed in advance with the telephone numbers of a plurality of call stations.

Relayed multi-station transmission is a system whereby manuscript information or the like is transmitted to a branch station by means of operating a special preselected key programmed in advance with the branch station and a plurality of substations, the manuscript information or the like being transmitted from the branch station to a plurality of substations.

With each of the above systems, a glance at the operating panel does not suffice to show which key corresponds to which call station, and so a table or diagram is usually prepared to show the correspondence between the keys on the operating panel and the call stations, this being generally placed by the side of the facsimile machine. The operator can then correctly carry out individual transmission, multi-station transmission, relayed multi-station transmission or the like by referring to this table or diagram.

As explained above, operation is conventionally carried out by preparing and referring to a table or diagram showing the correspondence between the call stations pre-programmed for individual transmission, multi-station transmission, relayed multi-station transmission or the like and the keys on the operating panel of the facsimile machine. Thus there is the operational problem that it is not possible to tell the relationship between the call stations and the keys on the operating panel at a glance.

Japanese Utility Model 1-52351 is an example of the disclosure of prior technology relating to this application. In this disclosure, technology is proposed whereby in a facsimile machine provided with program keys such that the series of facsimile transmission operations required to achieve relayed multi-station transmission or the like is assigned to a certain key, permitting complex transmissions to be carried out thereafter simply by pushing this key, the series of operational procedure can be read out and modified on a display unit.

However, the operational procedure displayed on the display unit in this prior technology stops at confirmation of the content assigned to the above-mentioned key, and no consideration is given to using the displayed operational procedure for some kind of indication.

SUMMARY OF THE INVENTION

The present invention has been made in view of the above circumstances and has as an object of removing the above difficulties associated with conventional apparatus, and to provide a hierarchical indication, inclusive indication and hierarchical inclusive indication input system using a coordinate input device in which the single or plurality of call destinations and a series of functions to be indicated are comprehensible at a glance, and which is able to carry out these indications at a single touch.

A further object of the present invention is to provide a hierarchical indication, inclusive indication and hierarchical inclusive indication input system such that indications for individual transmission, multi-station transmission or relayed multi-station transmission can be carried out as desired from the organizational chart displayed on the coordinate input device.

According to one embodiment of the present invention, since input is possible by indicating one point from an organizational chart expressing a hierarchy, the single or plurality of call destinations or a series of functions to be indicated can be grasped at a glance, and simply and accurately indicated in sequence and operability is greatly improved. For example, multi-station indication, relayed multi-station indication and the like inputs can be simply and accurately carried out.

According to another embodiment of the invention, functions having partially overlapping domains or con, non domains can be indicated by indicating one point within the partially overlapping domain or common domain, and operability is greatly improved.

According to yet another embodiment of the invention, hierarchically arranged functions and functions included in a con, non domain can be executed selectively.

According to a further embodiment of the invention, it is possible to execute a function whereby functions included in a con, non domain are removed from hierarchically arranged functions.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the indication input system of this invention comprises coordinate input means for displaying an organizational chart expressing the relationship of a plurality of functions, and for registering the coordinates of a point when indicated on the organizational chart, a memory for storing a data table including the plurality of functions, a plurality of key domains which define the coordinate boundary of each function, and related data which defines the relationship between the plurality of functions as expressed on the organizational chart, and control means for determining which functions have been selected when a point is indicated on the coordinate input means, and sequentially effecting the execution of the selected functions and the functions related to the selected functions.

BRIEF DESCRIPTION OF THE DRAWINGS

The accompanying drawings, which are incorporated in and constitute a part of this specification illustrate embodiment(s) of the invention and, together with the description, serve to explain the objects, advantages and principles of the invention. In the drawings.

FIG. 2 is an organizational chart for the first embodiment of the present invention.

FIG. 3 is a data table for the first embodiment of the present invention.

FIG. 4 is a flow chart showing the operation of the first embodiment of the present invention.

FIG. 17 is an organizational chart for the sixth embodiment of the present invention.

FIG. 18 is a data table for the sixth embodiment of the present invention.

FIG. 20 is an organizational chart for the seventh embodiment of the present invention.

FIG. 21 is a data table for the seventh embodiment of the present invention.

FIG. 23 is an explanatory diagram showing nesting.

FIG. 26 is a flow chart showing the important parts of the operation of the eighth embodiment of the present invention.

DETAILED DESCRIPTION OF THE PREFERRED EMBODIMENTS

The inventions will now be described in detail with reference to the drawings.

Figure 1:
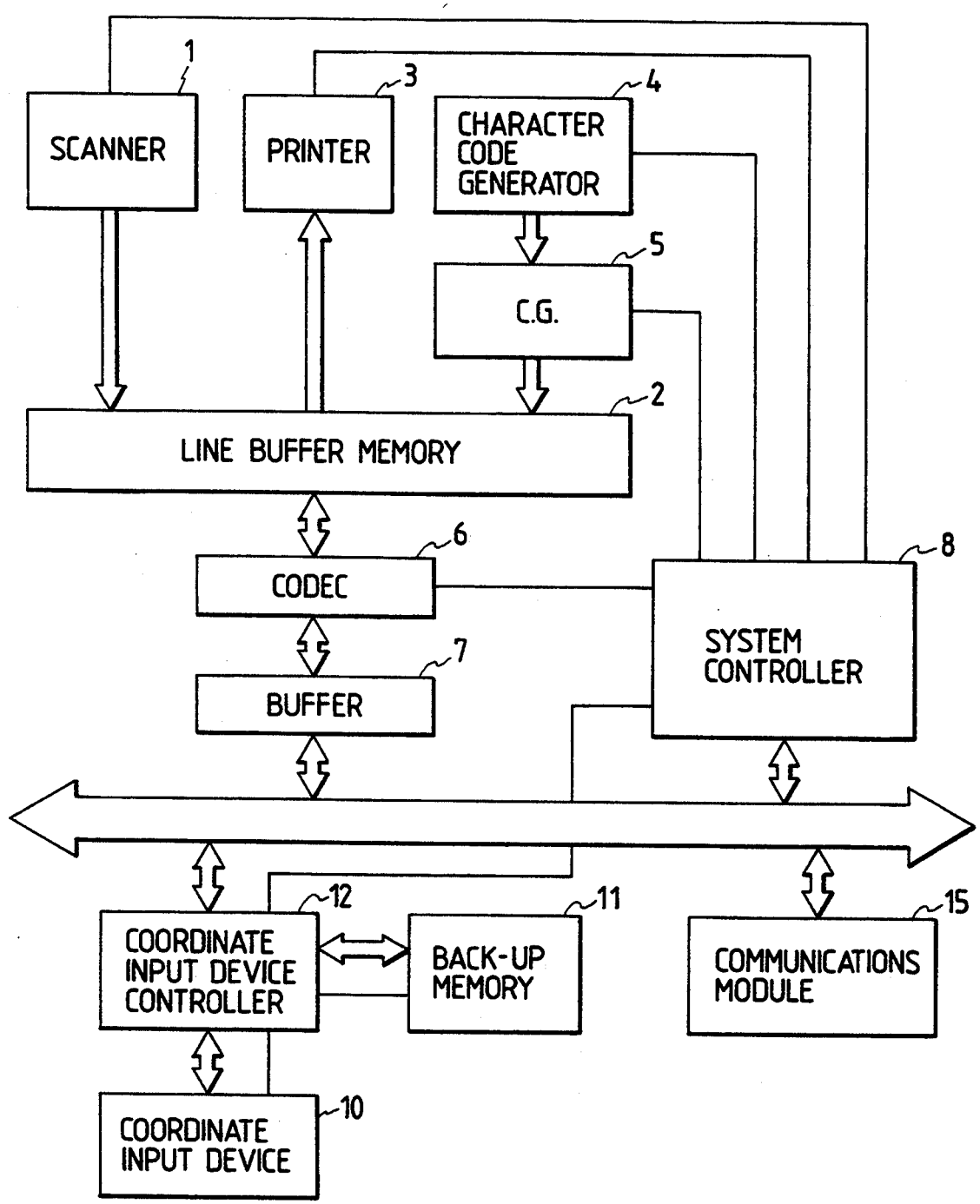
FIG. 1 is a block diagram of the system of the present invention.

FIG. 1 is a block diagram showing the basic structure of a system to which the present invention has been applied. The system includes: a scanner 1 which reads the manuscript information; a line buffer memory 2 which stores the read data; a printer 3 which prints out the data; a character code generator 4; a character generator 5 which converts the character codes from the character code generator 4 into image data; an encoder/decoder device 6 which encodes and decodes the manuscript data; a buffer 7; a system controller 8 which controls the operation of the scanner 1, printer 3, character generator 5 and encoder/decoder device 6; a coordinate input device 10; a back-up memory 11 for the coordinate input device 10; a controller 12 for the coordinate input device 10; and a communications module 15. System controller 8 controls the operation of coordinate input device controller 12, and coordinate input device controller 12 controls coordinate input device 10 and back-up memory 11.

In a device of the above structure, manuscript information read out from scanner 1 and image data generated by character code generator 4 and converted by character generator 5 are initially recorded in line buffer memory 2. They are then encoded by encoder/decoder device 6, stored in buffer 7, and sent to communications module 15.

At the same time, as will become clear from the explanation that follows, indications for the destination of individual transmission, multi-station transmission, relayed multi-station transmission, sequential transfer transmission and the like, or indications for function selection, are carried out from coordinate input device 10 using its coordinate data. These indications are input to the coordinate input device controller 12 which converts these indications into specific data, transmission data such as telephone numbers or functional data such as photocopying, by referring to coordinate input device back-up memory 11.

The specific data is sent to communications module 15 via the system controller 8 in the case of call destination data, data communications module 15 processes the manuscript from the buffer 7 in accordance with the indications. For example, when the indication from coordinate input device 10 is for multi-station transmission, the system controller 8 specifies one end station from the multi-station destination and sends the telephone number for that end station to communications module 15, communications module 15 then transmits the manuscript data from the buffer 7 to the multi-station destination.

At the same time, when the specific data is for a function such as photocopy, it is sent to system controller 8 and the function is carried out.

The present invention relates to a hierarchical indication, inclusive indication, and hierarchical inclusive indication input system realized using the coordinate input device 10, coordinate input device backup memory 11 and coordinate input device controller 12, and will now be explained in detail. The structure and operation of coordinate input device 10 have been disclosed in an application by the same applicant, Japanese Patent Application No. 1-261767 'Batch recording system for operational procedure', which is incorporated by reference herein.

(1) Hierarchical Indication Systems (a) Simple Hierarchical Indication

Simple hierarchical indication is a process utilizing a chart 21 having a hierarchical structure as shown, for example, in FIG. 2. For example, when an indication is made for the Tokyo head office, a transmission can be sent to the Tokyo head office as well as the Fukuoka, Osaka and Sendai branches linked to it on the lower level. However, when there is an indication for the Fukuoka branch, the transmission can only be sent to the Fukuoka branch.

FIG. 2 shows a chart 21 having a hierarchical structure as drawn on coordinate input device 10 in FIG. 1. The hierarchical structure chart 21 could be drawn on paper, film or the like and placed on coordinate input device 10. FIG. 3 is a conceptual diagram showing the data held in back-up memory 11 of the coordinate input device 10 in FIG. 1.

As is shown in FIG. 3, items in the coordinate input device back-up memory 11 include key domain, key number, designation, related data stored in relation memory and telephone number (or a content indicating telephone number, for example an abbreviated number). Two coordinates for each domain in FIG. 2 are input in the key domain column. For example, the coordinates of the Tokyo head office $(x_1, y_1)$, $(x_1', Y_1')$ and the coordinates of the Fukuoka branch $(x_2, y_2)$, $(x_2', Y_2')$ and so on are input in the key domain column. Key numbers are the numbers assigned automatically by the coordinate input device controller 12, and increase in the order in which data is recorded. Moreover, the key number of the related call destination is stored in the related memory column. Registering of the data in the coordinate input device back-up memory 11 is carried out using coordinate input device 10 and the operation panel (not shown). Details of this are disclosed in an application by the same applicant, Japanese Patent Application No. 1-321541 'Method of registering operation keys', which is hereby incorporated by reference.

In this particular embodiment, it should be noted that the coordinate boundaries of each destination (or function) are exclusive of one another.

The operation of a first embodiment of the present invention will now be described with reference to FIG. 4. FIG. 4 is a flow chart explaining the function of the coordinate input device controller 12.

First the symbols will be explained. The "a" in the "a[n][J]" of step S4 in the diagram is data, "n" indicates the key number, and "J" indicates the number of the data holding domain in the related memory. Thus a[n][J] indicates data held in area J of the related memory of key number "n".

For example, such combinations as a [1][1]=2, a[1][2]=3, a[2][1]=0, a[3][1]=5 are possible.

In this first embodiment, when the manuscript to be transmitted is set in scanner 1, if a point within the Tokyo head office frame on hierarchical structure chart 21 is indicated with the stylus pen (not shown) attached to coordinate input device 10 or the like, the storage operation for the data of the manuscript transmission to buffer 7 is carried out. Moreover, the coordinate data of the indicated point is sent to coordinate input device controller 12, and on the basis of this coordinate data, coordinate input device controller 12 then searches for the data in FIG. 3 contained in coordinate input device back-up memory 11. At this time the process of step S1 in FIG. 4 is carried out, with the result that key number 1 is read out. When key number 1 is read out, the process moves on to step S2, the telephone number corresponding to the key number 1 is read out, and then the manuscript data is transmitted to the facsimile machine of the destination represented by key number 1.

Next, the relation J=1 is established (step S3), and a decision is taken (step S4) as to whether a[1][1] is data representing a key number, a separation code or a termination code. In this embodiment, a[1][1]=2 and is a key number, so the process goes on to step S5, where a decision is taken as to whether a[1][1] is 0 or not (step S5). The decision is negative, so the process goes on to step 6, where transmission to a[1][1] (i.e. key number 2) takes place. When this is completed, the process goes on to step S7, where 1 is added to J. Operation steps S4 and below are then carried out again. With the repetition of the operation steps S4 and below, sequential transmission is carried out to key numbers 3 and 4, and after termination of transmission to key number 4, the termination code is read, the process goes on to step S8 and the operation is terminated by key number 1.

As a result, when the Tokyo head office is indicated, transmission is carried out to the Tokyo head office and the Fukuoka, Osaka and Sendai branches. When the Osaka branch is indicted, it will be clear that in the same way transmission is carried out to the Osaka branch and the Kyoto, Hyogo and Okayama offices.

If the Fukuoka branch is indicated by the stylus pen or the like, transmission to key number 2 occurs at step S2, the relation J=1 is established at step S3, it is expressed at step S4 as a key number and the decision at step S5 is positive as a[2][1]=0.

As a result, the process goes on to step S8, and transmission is carried out to the Fukuoka branch only. Where the Sendai branch, and Kyoto, Hyogo or Okayama offices are indicated using the stylus pen or the like, it will be evident that in the same way transmission is carried out only to the destination indicated.

In the above way, as this first embodiment makes it possible to indicate the call destination by looking at the hierarchical structure chart in FIG. 2, the single or plurality of call destinations which are to be indicated can be grasped at a glance. Furthermore, it is possible to transmit the manuscript information to the desired single or plurality of call destinations at a single touch.

By registering functions corresponding with each key number in FIG. 3, the step of selecting transmission at the beginning of the above operation can be omitted where this function is set as 'transmission'. This is the same for the following embodiments as well.

(b) Multi-Station Hierarchical Indication

Figures 5, 6:
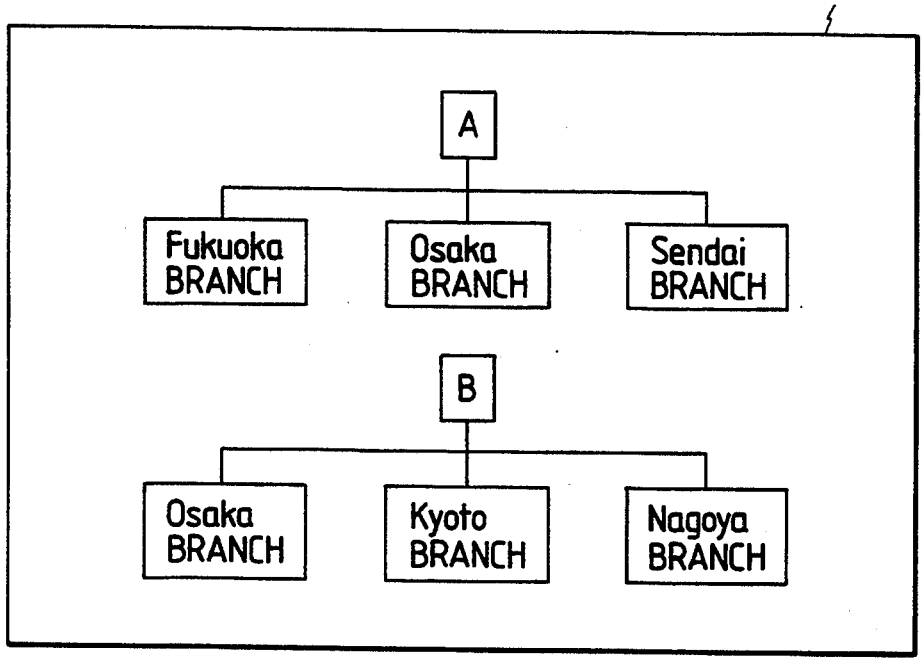
FIG. 5 is an organizational chart for the second embodiment of the present invention.
FIG. 6 is a data table for the second embodiment of the present invention.

Multi-station hierarchical indication is a process utilizing a hierarchical structure chart 21 as shown, for example, in FIG. 5. When A on the upper level is indicated, multi-station transmission can be carried out to the Fukuoka, Osaka and Sendai branches on the lower level, and in the same way, when B is indicated, multi-station transmission can take place to Osaka, Kyoto and Nagoya.

FIG. 5 shows a chart 21 showing hierarchical structure as drawn on coordinate input device 10. The hierarchical structure chart 21 could be drawn on paper, film or the like and placed on the coordinate input device 10. FIG. 6 is a conceptual diagram showing the data held in back-up memory 11 of the coordinate input device 10.

In this particular embodiment, it should be noted that key domains for A and B each define coordinate boundaries for indication of more than one of the plurality of destinations (or functions) shown, and which are exclusive of the coordinate boundaries of the destinations which may be indicated by touching these key domains.

Figure 7:
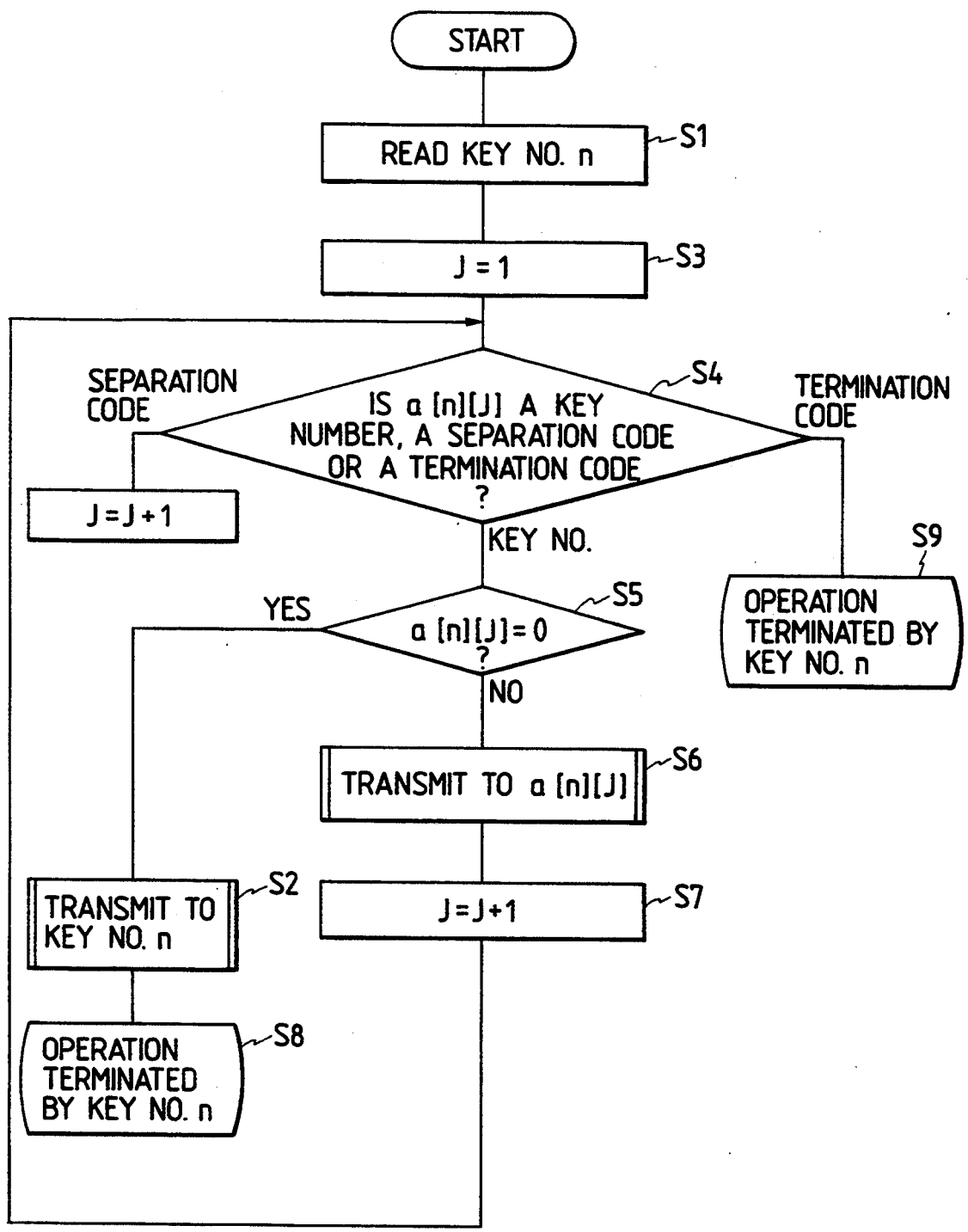
FIG. 7 is a flow chart showing the operation of the second embodiment of the present invention.

The operation of the second embodiment of the present invention will be explained with reference to FIG. 7. FIG. 7 is a flow chart explaining the functions of the coordinate input device controller 12.

The difference between this flow chart and the flow chart shown in FIG. 4 is that step S2 has been moved to the position after a positive decision is reached in step S5.

It should be clear from the drawings and the foregoing discussion that, according to this second embodiment, when A in FIG. 5 is indicated by a stylus pen or the like, multi-station transmission is carried out to Fukuoka, Osaka and Sendai branches, and when the Nagoya branch is indicated for example, transmission is carried out to the Nagoya branch only.

(c) Relayed Multi-Station Hierarchical Indication

Figures 8, 9:
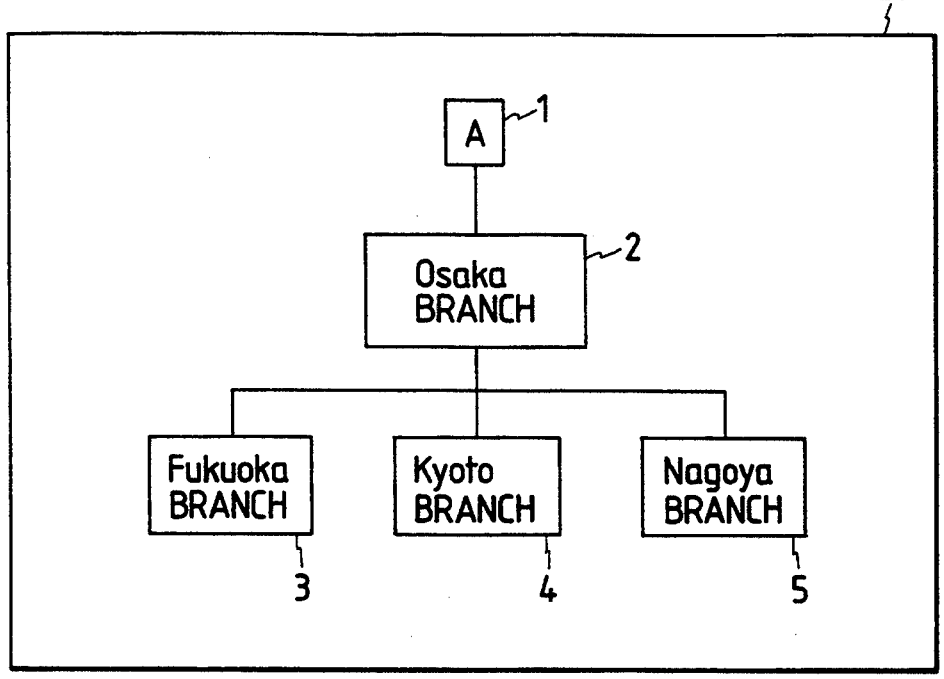
FIG. 8 is an organizational chart for the third embodiment of the present invention.
FIG. 9 is a data table for the third embodiment of the present invention.

Relayed multi-station hierarchical indication is a process utilizing a hierarchical structure chart 21 as shown, for example, in FIG. 8. When A in the uppermost position is indicated, manuscript information is first transmitted to the Osaka branch which is the relay station, and then multi-station transmission is carried out from the Osaka branch to each of the Fukuoka, Kyoto and Nagoya branches.

FIG. 8 shows a chart showing hierarchical structure as drawn or coordinate input device 10. The hierarchical structure chart 21 could be drawn on paper, film or the like and placed on coordinate input device 10. FIG. 9 is a conceptual diagram showing the data held in back-up memory 11 of the coordinate input device 10.

In this particular embodiment, it should be noted that the key domain for A defines a coordinate boundary for indication of more than one of the plurality of destinations (or functions) shown, and which is exclusive of the coordinate boundaries of the destinations which may be indicated by touching this key domain.

Figure 10:
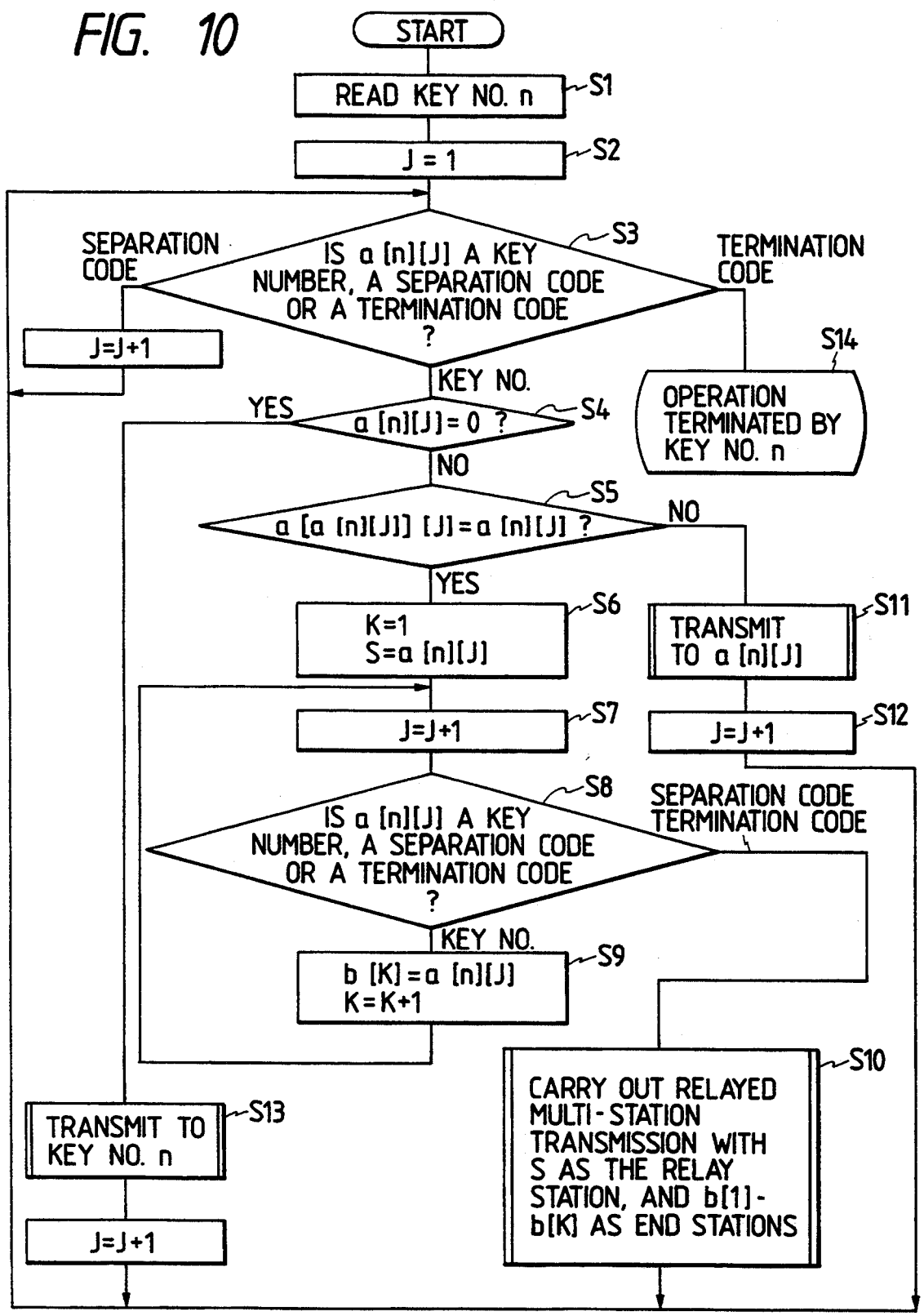
FIG. 10 is a flow chart showing the operation of the third embodiment of the present invention.

The operation of the third embodiment of the present invention will be explained with reference to FIG. 10. FIG. 10 is a flow chart explaining the functions of the coordinate input device controller 12.

When the key domain A in the hierarchical structure chart 21 is indicated by the stylus pen or the like, key number 1 is read out (step S1). Next, the relation $J=1$ is established (step S2), and then the process moves on to step S3. Since $a[1][1]=2$, step S3 progresses on to step S4, and at step S4 a decision is made as to whether or not $a[1][1]$ is equivalent to 0. The decision at step S4 is negative, and the process moves to step S5, where the decision is taken as to whether or not the relation $a[2][1]=a[1][1]=2$ is true. In other words, the decision is taken as to whether or not the station of key number 2 is the relay station. If step S5 is positive, it is the relay station, and the process moves on to step S6.

At step S6, the relations relay station $S=a[1][1]$, in other words relay station S=station of key number 2, and $K=1$ are established. At step S7, 1 is added to J.

Next, at step S8 a decision is taken as to whether $a[1][2]$ is a key number, a separation code, or a termination code, and when it is a key number, the process moves on to step S9, and the relation end station $b[1]=a[1][2]$ is established. In other words, the station of key number 3 is registered as the end station, 1 is added to K and the process returns to step S7.

As 1 is added to J at step S7, the decision is taken at step S8 as to whether or not $a[1][3]$ is a key number, and as $a[1][3]=4$ is a key number, the relation end station $b[2]=a[1][3]$ is established. In other words, the station of key number 4 is registered as an end station. The same operation continues, and the station of key number 5 is also registered an end station.

Thereafter, when the termination code is recognized at step S8, the process moves on to step S10, and relayed multi-station transmission takes place with the-relay station as S, and the end stations as b[1]-b[4].

At the same time, where one of the three branches Fukuoka, Kyoto or Nagoya is indicated, step S4 is positive and the process moves to step S13 where transmission to one of key numbers 3-5 is carried out. The effectiveness of step S11 is shown when the data registered in the related memory of key number 1, in FIG. 9 for example is registered not in the order 2, 3, 4, 5 but with key number of a station that is not the relay station registered first, for example in order 3, 2, 4, 5.

As explained above, according to this embodiment it is possible to carry out relayed multi-station transmission with the Osaka branch as the relay station by indicating one point on domain A in hierarchical structure chart 21.

(2) Inclusive Indication System (a) Simple Inclusive Indication

Figures 11, 12:
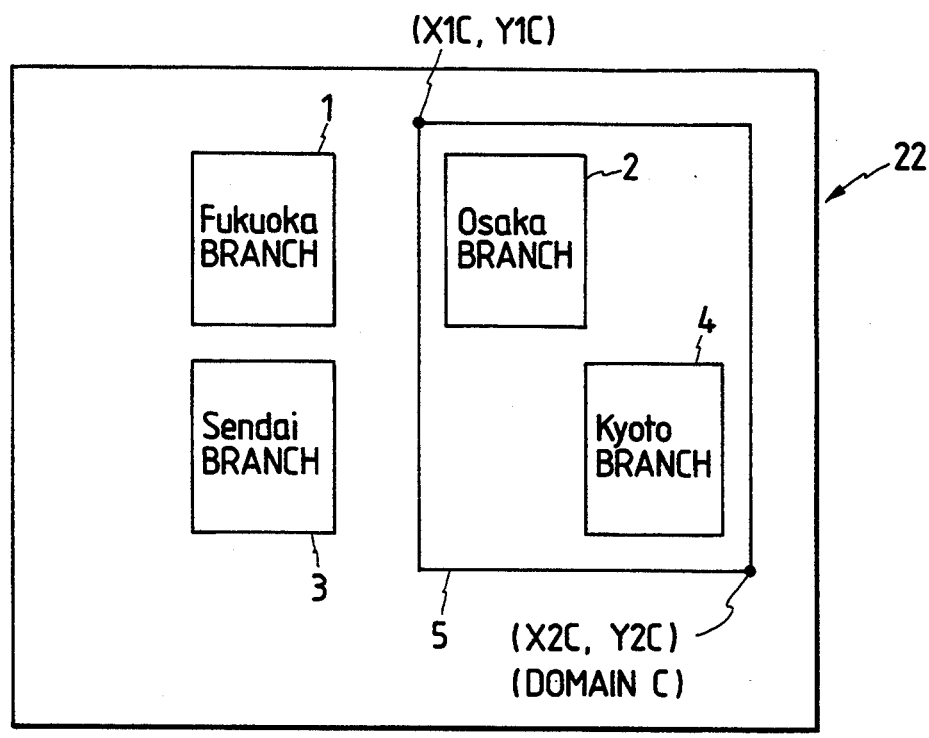
FIG. 11 is an organizational chart for the fourth embodiment of the present invention.
FIG. 12 is a data table for the fourth embodiment of the present invention.

Simple inclusive indication is a process utilizing a structural chart 22 as shown in FIG. 11, for example. If one point within a common domain (the domain of key number 5) is indicated, multi-station transmission is carried out to both the Osaka branch and the Kyoto branch included within this con, non domain. If an area within the domain of key number 2 or key number 4 is indicated, it is possible to limit the effect to that key number only.

FIG. 11 shows a structural chart 22 as drawn on coordinate input device 10. The structural chart 22 could be drawn on paper, film or the like and placed on coordinate input device 10. FIG. 12 is a conceptual diagram showing the data held in back-up memory 11 of the coordinate input device 10.

In this particular embodiment, it should be noted that the key domain uniquely identified by key number 5 defines a coordinate boundary for indication of more than one of the plurality of destinations (or functions) shown, and which is inclusive of the coordinate boundaries of the destinations which may be indicated by touching this key domain.

Figure 13:
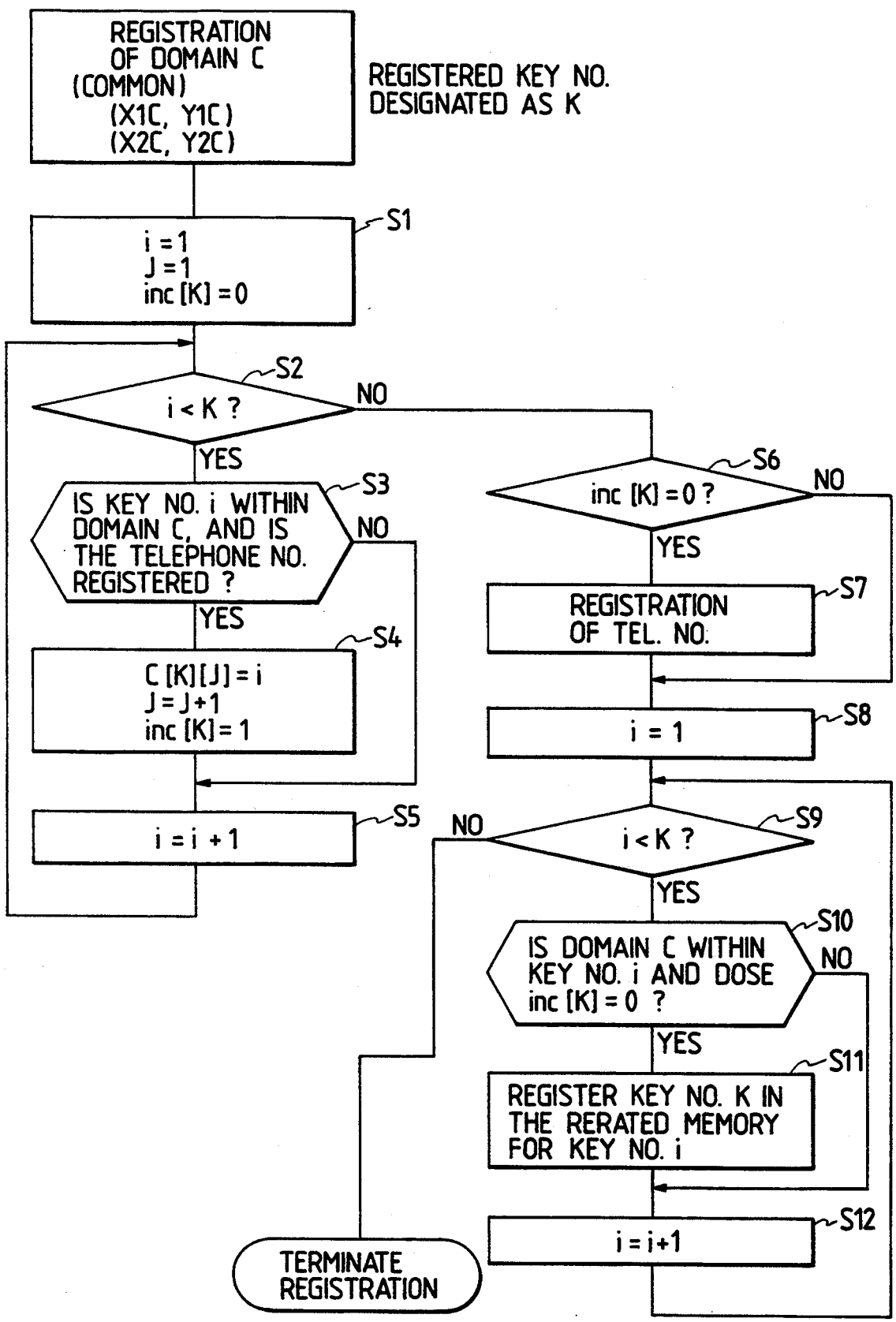
FIG. 13 is a flow chart showing the registration operation for the fourth embodiment of the present invention.

The operation of registering data such as shown in FIG. 12 in the coordinate input device back-up memory 11, for the fourth embodiment of the present invention will be explained. FIG. 13 is a flow chart explaining the registration operation.

For the moment, assuming that key numbers 1-4 in FIG. 11 have already been registered, registration of the data of domain C (common) of key number 5 will be explained.

At step S1, the relations $i=1$, $J=1$ and $inc[5]=0$ are established. Here "inc" has the meaning of inclusive. Furthermore, the relation $K=5$ is established as K indicates the key number to be registered.

At step S2, the decision as to whether or not the condition i<K is satisfied is taken, and where it is positive, the process moves on to step S3 and the decision is taken as to whether key number 1 is included in domain C, and whether or not the telephone number is registered.

Since in the example of FIG. 11 this is negative, the process moves on to step S5 where 1 is added to i, which becomes 2, and the decision of step S2 is taken again. When the decision at step S2 is positive, the decision is taken at step S3 as to whether or not domain C is included in key number 2 and the telephone number registered. Since this decision is positive, the process moves on to step S4, where the relations C[K][J]=2, J=2, and inc[5]=1 are established. As a result, C[K][J]=C[5][1]=2 is registered as the first data of the inclusive memory.

Next, the process moves to step S5 where i is set at 3, and the operations of steps S2–S5 are carried out again. As the Sendal branch of key number 3 is not included in domain C, it is not registered in the inclusive memory, and at step S5 i is set at 4 and the process goes back to step S2. The decision at step S2 is positive, and the process moves on to step S3, where the decision is taken as to whether or not the Kyoto branch of key number 4 is included in domain C and the telephone number registered. This decision is positive, and the process moves to step S4, where the relations C[K][J]=4, J=3, and inc[5]=1 are established. As a result, C[K][J]=C[5][2]=4 is registered as the second data of the inclusive memory.

Next, i becomes 5 at step S5 which produces a negative result from the decision at step S2, and the process moves on to step S6. At step S6 the decision is taken as to whether or not inc[5]=0, and if positive the telephone number is registered at step S7, and if negative, the process moves on to step S8. Telephone numbers are registered at step S7 because where the domain under consideration contains no domains, it becomes an independent normal key.

In this example, the relation inc[5]=1 holds, so the process moves on to step S8, where the relation i=1 is established. Then at step S9 the decision is again made as to whether or not the relation i<K holds, and when positive the process moves on to step S10, where the decision is taken as to whether or not key number 1 is included in domain C, and whether or not inc[5]=0. If this decision is negative, the process moves on to step S12, where 1 is added to i. From there on the procedure of steps S9–S12 is repeated, and when the decision of step S9 is negative, the registration operation is terminated.

In the case of a normal key, steps S9–S12 are checking steps for the inclusive keys previously registered, and may be omitted.

Next, the operation by which indication of a point of 5 within domain C in FIG. 11 using a stylus pen or the like results in transmission of manuscript information to the call destinations corresponding to the normal keys included in the domain C will be explained with reference to FIG. 14.

Figure 14:
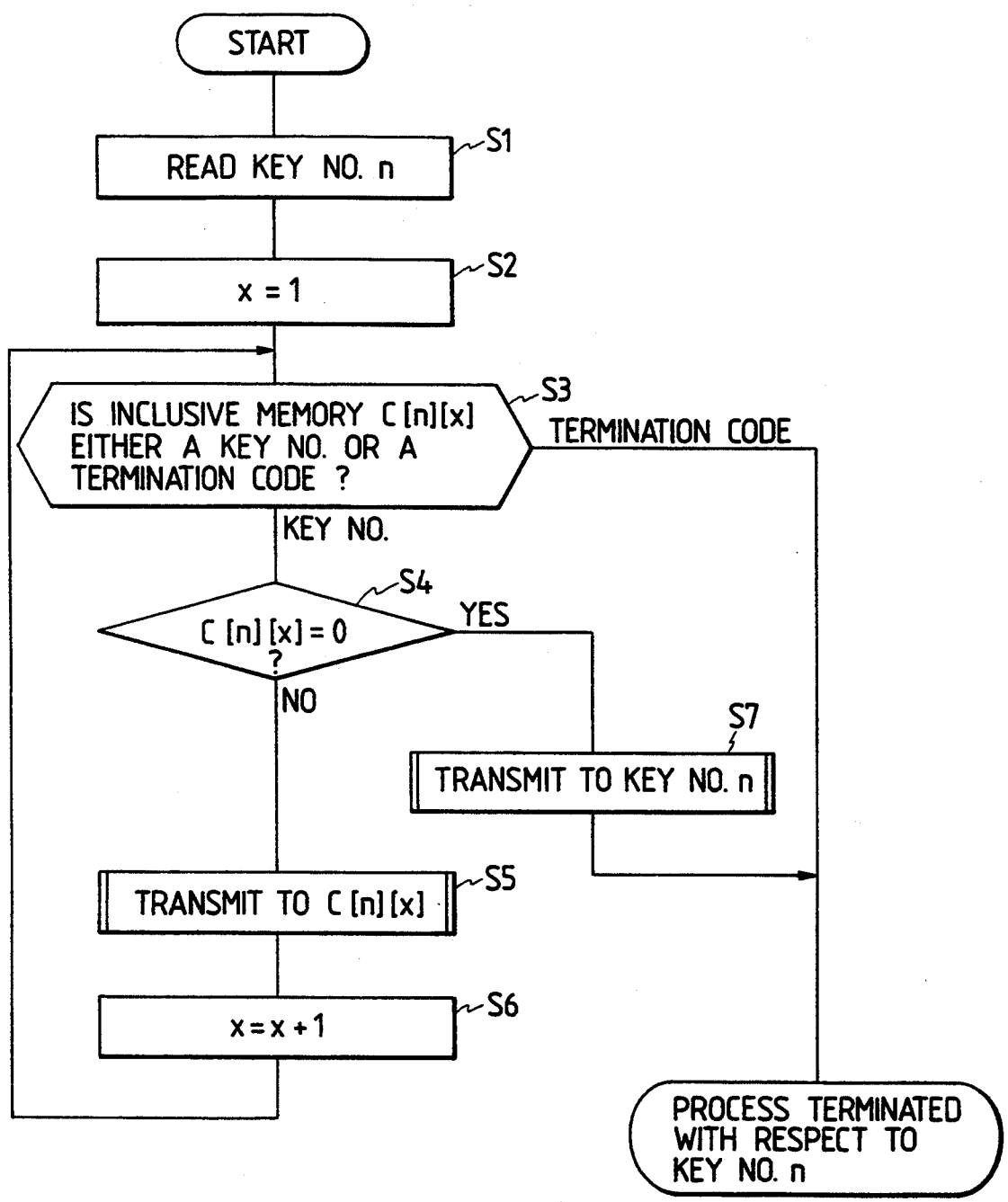
FIG. 14 is a flow chart showing the indication operation of the fourth and fifth embodiments of the present invention.

When a point with domain C in FIG. 11 (provided that it is not within the Osaka branch and Kyoto branch domains) is indicated using a stylus pen, the fact that key number 5 in FIG. 12 has been indicated is recognized from its coordinates, and key number n in step S1 of FIG. 14 becomes 5.

Next, the relation x=1 is established at step S2, and a decision is then taken at step S3 as to whether inclusive memory C[n][x] is a key number or a termination code. Since inclusive memory C[5][1]=2 is a key number, the process moves on to step S4, where the decision is taken as to whether or not the relation inclusive memory C[5][1]=0 is true. When this decision is negative, the process moves on to step S5, and transmission takes place to C[5][1]=2, i.e. the facsimile machine of key number 2.

Following on from this, 1 is added to x, and the process returns again to step S3, where a decision is made as to whether C[5][2] is a key number or a termination code. Since C[5][2]=4 in this case, the process moves on to step S4 and when this decision is negative moves on to step S5, and transmission takes place to the facsimile machine of key number 4.

Next, the relation x=3 is established, and the decision is taken at step S3. This time step S3 decides it is a termination code, and the transmission procedure with respect to key number 5 is terminated. Step S7 is effective where an ordinary key domain is indicated by the stylus pen or the like.

The above explanation was for the case where a point in domain C excluding the Osaka branch and Kyoto branch domains was indicated, but if the operation in FIG. 22, which will be described later, is added in before the operation of step S1 in FIG. 14 this embodiment will operate effectively even if the Osaka branch and Kyoto branch domains within domain C are indicated, it being possible to carry out transmission to both the Osaka branch and the Kyoto branch.

Figure 22:
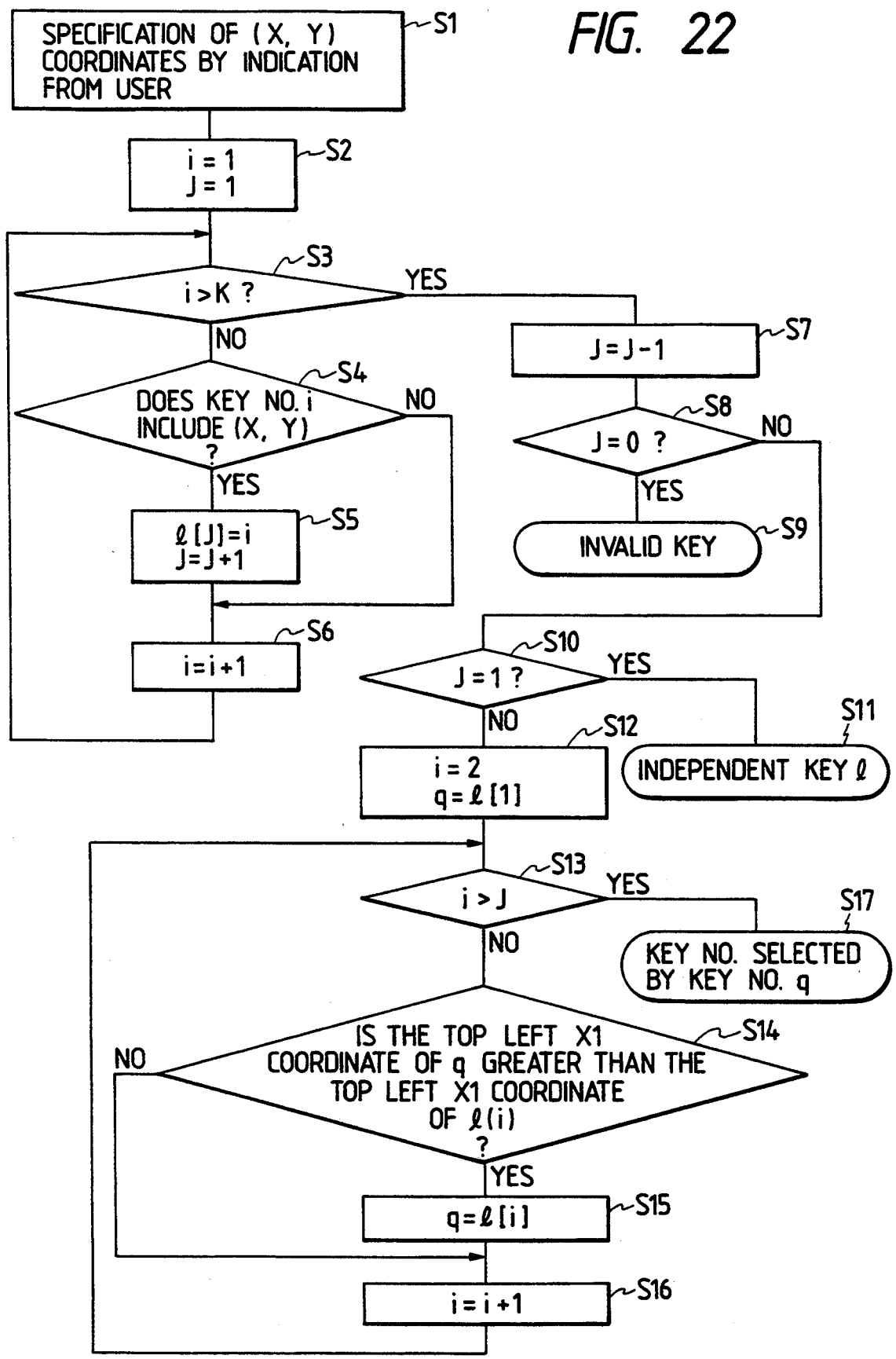
FIG. 22 is a flow chart showing the operation of the seventh embodiment of the present invention.

Here FIG. 22 is a flow chart for an operation specifying the outermost domain as the key number in the case where the domains are nesting. Details will become clear in the explanation that follows.

(b) Partially Overlapping Indication

Figures 15, 16:
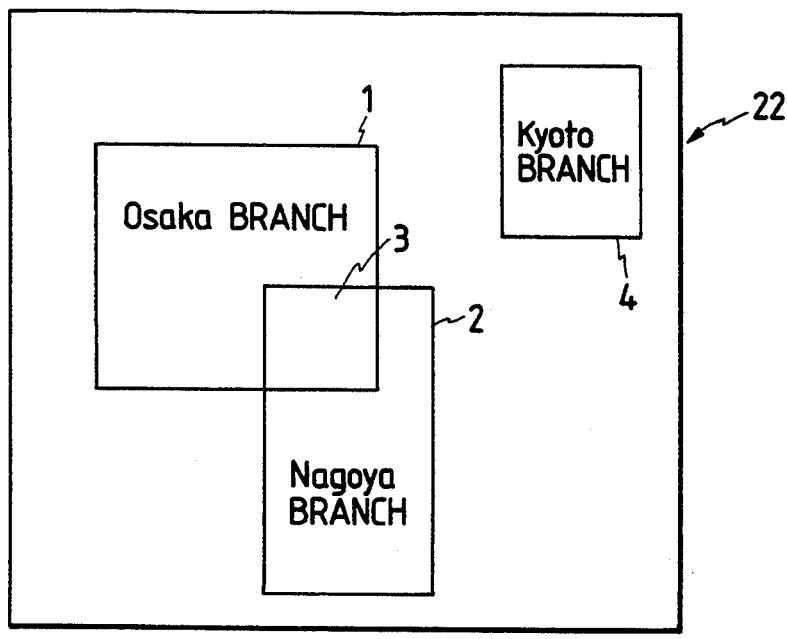
FIG. 15 is an organizational chart for the fifth embodiment of the present invention.
FIG. 16 is a data table for the fifth embodiment of the present invention.

Partially overlapping indication is a process utilizing a chart 22 having a structure as shown, for example, in FIG. 15. When a point within the common domain (domain of key number 3) is indicated, a multi-station transmission can be sent to both the Osaka branch and Nagoya branch which share this common domain.

FIG. 15 shows a structural chart 22 as drawn on the coordinate input device 10. The structural chart 22 could be drawn on paper, film or the like and placed on coordinate input device 10. FIG. 16 is a conceptual diagram showing the data held in coordinate input device back-up memory 11.

In this particular embodiment, it should be noted that key domain uniquely identified by key number 3 defines a coordinate boundary for indication of more than one of the plurality of destinations (or functions) shown, and includes only the area common to the coordinate boundaries of the destinations which may be indicated by touching this key domain.

It will be clear that in this fifth embodiment of the present invention as well, due to the operation in FIG. 14, multi-station transmission can be carried out to both the Osaka branch and the Nagoya branch when the domain of key number 3 is indicated with a stylus pen or the like. It should be noted that 'inclusive memory'in step S3 of FIG. 14 can be read as 'overlapping memory'. Moreover, it will be clear that if the domain within the Osaka branch that does not overlap with the Nagoya branch is indicated, step S7 in FIG. 14 is activated, and transmission is sent to the Osaka branch of key number 1 only.

A sixth embodiment of the present invention relating to partially overlapping indications will be explained with reference to FIGS. 17, 18 and 19.

In structural chart 22 in FIG. 17 each of the 'transmit', 'copy' and 'receive' functions is expressed in a partially overlapping format. Here the 'transmit' domain has been assigned to key number 1, the 'copy' domain to key number 2, and the 'receive' domain to key number 3.

Figure 19:
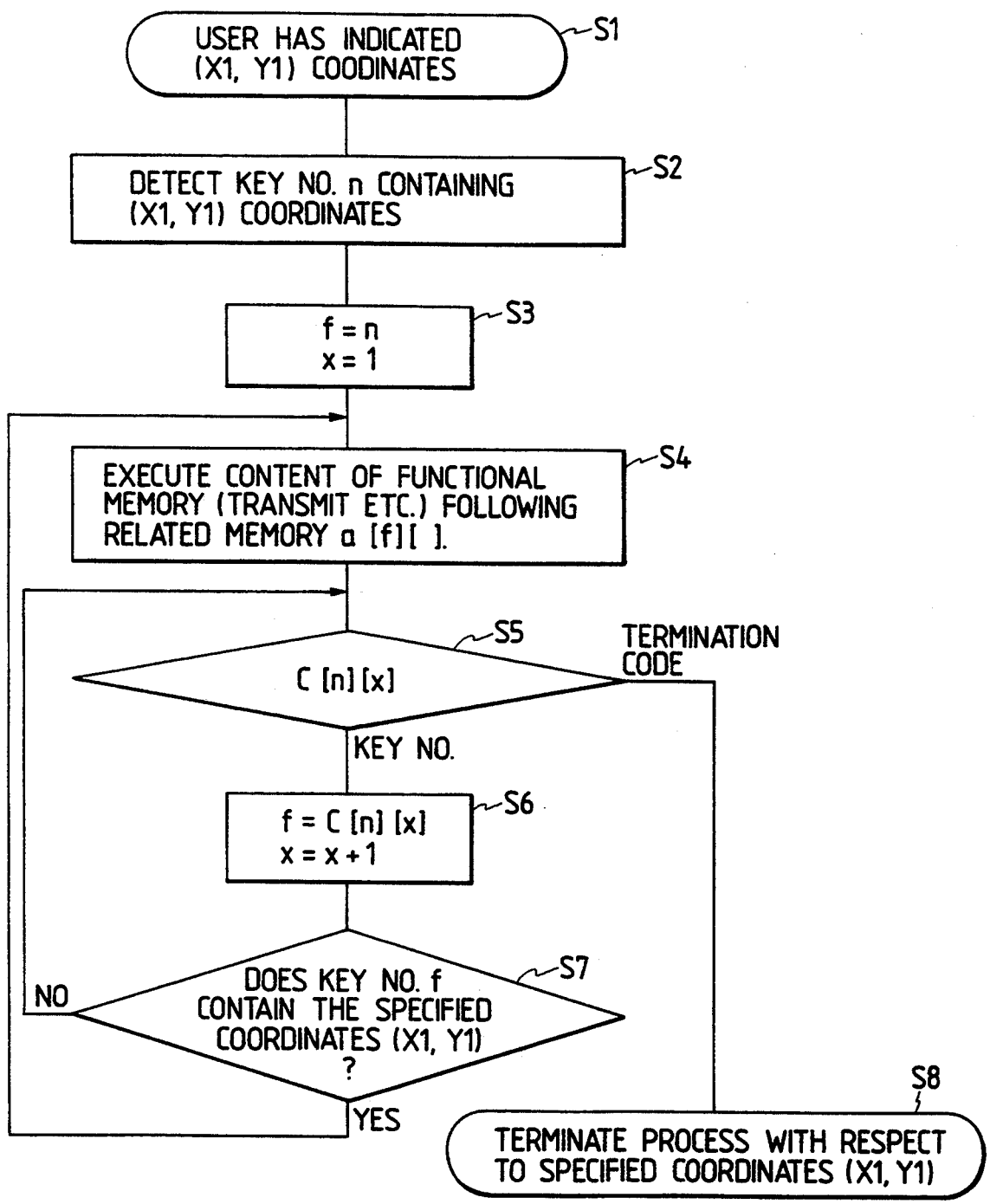
FIG. 19 is a flow chart for the sixth embodiment of the present invention.

FIG. 18 is a conceptual diagram showing the data held in back-up memory 11 of the coordinate input device 10, and FIG. 19 is a flow chart explaining the function of the coordinate input device controller 12. The difference between the data in FIG. 16 and FIG. 18 is that in FIG. 16 the key domains in the overlapping part are defined by key numbers, whereas in FIG. 18 they are not defined.

The operation of this sixth embodiment will be explained with reference to FIG. 19 on the assumption that the user has indicated the point 'a' in FIG. 17.

When the user indicates point 'a' (step S1), the smallest key number n among the key numbers corresponding to this point is detected in step S2. In other words, key number 1 is detected.

Next, at step S3, the relations f=n=1, X=1 are established. Following this, the content of the functional memory of related memory a[1], i.e. 'transmit', is executed (step S4). After this at step S5, the decision is taken as to whether overlapping memory C[1][1] is a key number or a termination code, and since C[1][1]=2, it is recognized as a key number, and the process moves on to step S6, where the relations f=C[1][1]=2 and X=2 are established.

Next, in step S7, the decision is taken as to whether or not the point 'a' is included in key number f, i.e. key number 2. When the decision is positive, the process returns again to step S4, and the content of the functional memory of related memory a[2], i.e. the 'copy' is executed. The decision is then taken as to whether or not C[1][2]=3 is a key number or a termination code, and since it is a key number, the relations f=C[1][2]=3, X=3 are established at step S6.

Next, a decision is taken as to whether or not key number 3 included the point 'a'. When this decision is positive, the process return again to step S4, and the content of the functional memory of related memory a[3], i.e. 'receive' is executed. Following this a decision is taken as to whether or not C[1][3] is a key number. This decision is negative, so the process moves on from step S5 to step S8. As a result, the procedure with respect to the specified coordinates (point 'a') is terminated.

From the above operation, it will be clear that if for example the one point 'b' is indicated, the 'copy and ' and 'receive' functions will be sequentially executed, and if the one point 'c' is indicated, the 'transmit' and 'copy' functions will be sequentially executed.

As explained above, according to this embodiment if a single point in the overlapping domain is indicated, the functions corresponding to it can be sequentially executed, and a user can execute a plurality of functions by means of a simple operation. Moreover, the function that will be executed is evident at a glance as the structural chart 22 in FIG. 17 is used.

(3) Multiple Layer (Hierarchical) Indication (a) Multiple Layer Specification

Multiple layer specification is a process utilizing a hierarchical chart comprising a plurality of layers as shown in FIG. 20. If a single point is indicated in a common domain C which straddles a plurality of layers, transmission can be carried out to the call stations included in the common domain C regardless of the hierarchy.

In this particular embodiment, it should be noted that key domain uniquely identified by key number 10 defines a coordinate boundary for indication of more than one of the plurality of destinations (or functions) shown, and which is inclusive of the coordinate boundaries of the destinations which may be indicated by touching this key domain. Further, it should be noted that key domains for A and B each define coordinate boundaries for indication of more than one of the plurality of destinations (or functions) shown, and which are exclusive of the coordinate boundaries of the destinations which may be indicated by touching these key domains.

FIG. 21 is a conceptual diagram of the data held in the backup memory 11 of the coordinate input device 10, and FIG. 22 is a flow chart explaining part of the function of the coordinate input device controller 12.

The following explanation of the operation of this seventh embodiment of the present invention assumes that the user has indicated the one point 'a' in the common domain C of FIG. 20 in step S1 of FIG. 22.

At step S2, the relations i=1, J=1 are established, and at step 3 a decision is taken as to whether or not the relation i>K holds. Here K is the maximum value of a key number, and in this example the relation K=10 is established.

When the decision at step S3 is negative, the process moves on to step S4, and a decision is taken as to whether key number 1 includes point 'a' or not. As this decision is negative, the process moves on to step S6, where i is incremented. As i=2, step S3 is negative, and as key number 2 does not include point 'a', step S4 is negative, and i is incremented at step S6.

The above operation is carried on in the same way as above until i=10. When i=10, the decision at step S4 is positive, and l[11]=10. Moreover, J is incremented, becoming 2.

Next, 1 is added on to i to make i=11, and the decision at step S3 is positive.

When the decision at step S3 is positive, the process moves on to step S7, 1 is subtracted from J, and the process moves on to step S8 where a decision is made as to whether or not J=O. When this decision is positive, as everything outside key numbers 1-10 has been specified, the specified keys are made invalid keys (step S9). At the same time, when step S8 is negative, the process moves on to step S10.

In this embodiment, as J=2 the decision at step S8 is negative and the process moves on to step S10. At step S10, the decision is taken as to whether or not J=1, and when this is positive the process moves on to step S11, and it is recognized as a single key. In this embodiment with J=1, and step S10 positive, it is recognized as a single key.

When it is recognized as a single key, the operation for inclusive indication in FIG. 14 is then executed. At this time the key number n of step S1 in FIG. 14 is 10, and the inclusive memory of step S3 uses the data held in the related memory of key number 10 in FIG. 21.

Now, if the user indicates point 'b' and not point 'a' in the step S1, i.e. where there is a nested indication, the same manuscript data will be sent twice to the Nagoya branch if some kind of preventative step is not taken.

The means of preventing this is the procedure shown in steps S12 onward in FIG. 22. In other words, it is an operation to find the largest frame within the nested domains. For example, where there is a triple overlap nesting as in FIG. 23, it is a process that finds the outermost frame 11.

At step S12, the relations i=2, and q=l[1] are established. At step S13 a decision is taken as to whether or not the relation i>J holds, and when this is negative a decision is made as to whether or not the X coordinate at the top left of q is bigger than the X coordinate at the top left of l[i]. Where this is positive, it means that the l[i] frame is further to the outside than the q frame, so q is updated to l[i] at step S15. At the same time when it is negative, the process moves on to step S16 and i is incremented.

In this way, when step S13 is positive the process moves on to step S17, and key number q is determined to be the most outward of the nesting domains.

Then following on from this, the operation of inclusive indication in the FIG. 14 is executed.

As explained above, according to this embodiment even where the common domain C straddles a plurality of layers, the functions included in the common layer can be executed. It is also possible for 'b' to be recognized as a single key when it is indicated.

However, when key A is indicated in FIG. 2, the operation in FIG. 10 is executed, and it is clear that relayed multi-station transmission is executed.

(b) Group Deletion Between Layers

Figure 24:
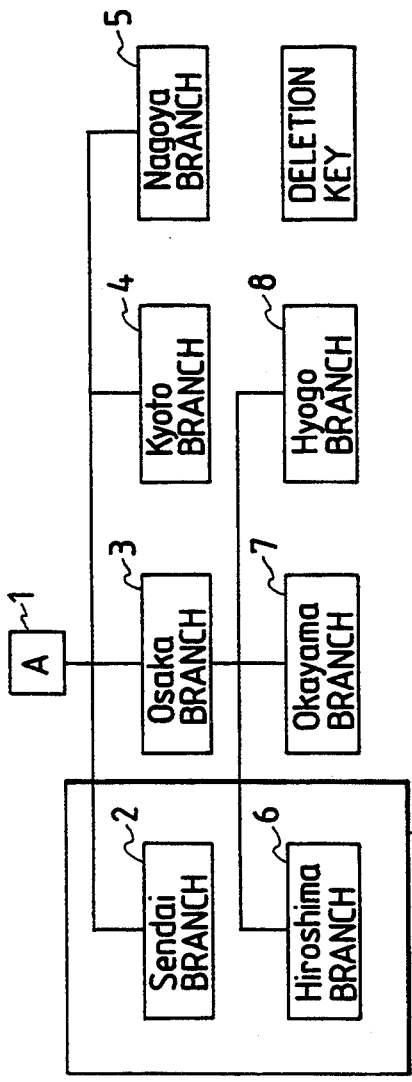
FIG. 24 is an organizational chart for the eighth embodiment of the present invention.

Group deletion between layers is a process utilizing a hierarchical chart comprising a plurality of layers as shown in FIG. 24. When the deletion key and one point within domain B which straddles a plurality of layers is specified, transmission is excluded from the call stations included within the domain B, regardless of the hierarchy.

In this particular embodiment, it should be noted that key domain uniquely identified by key number 9 defines a coordinate boundary for indication of more than one of the plurality of destinations (or functions) shown, and which is inclusive of the coordinate boundaries of the destinations which may be indicated by touching this key domain. Further, it should be noted that key domain for A defines a coordinate boundary for indication of more than one of the plurality of destinations (or functions) shown, and which is exclusive of the coordinate boundaries of the destinations which may be indicated by touching this key domain.

Figure 25:
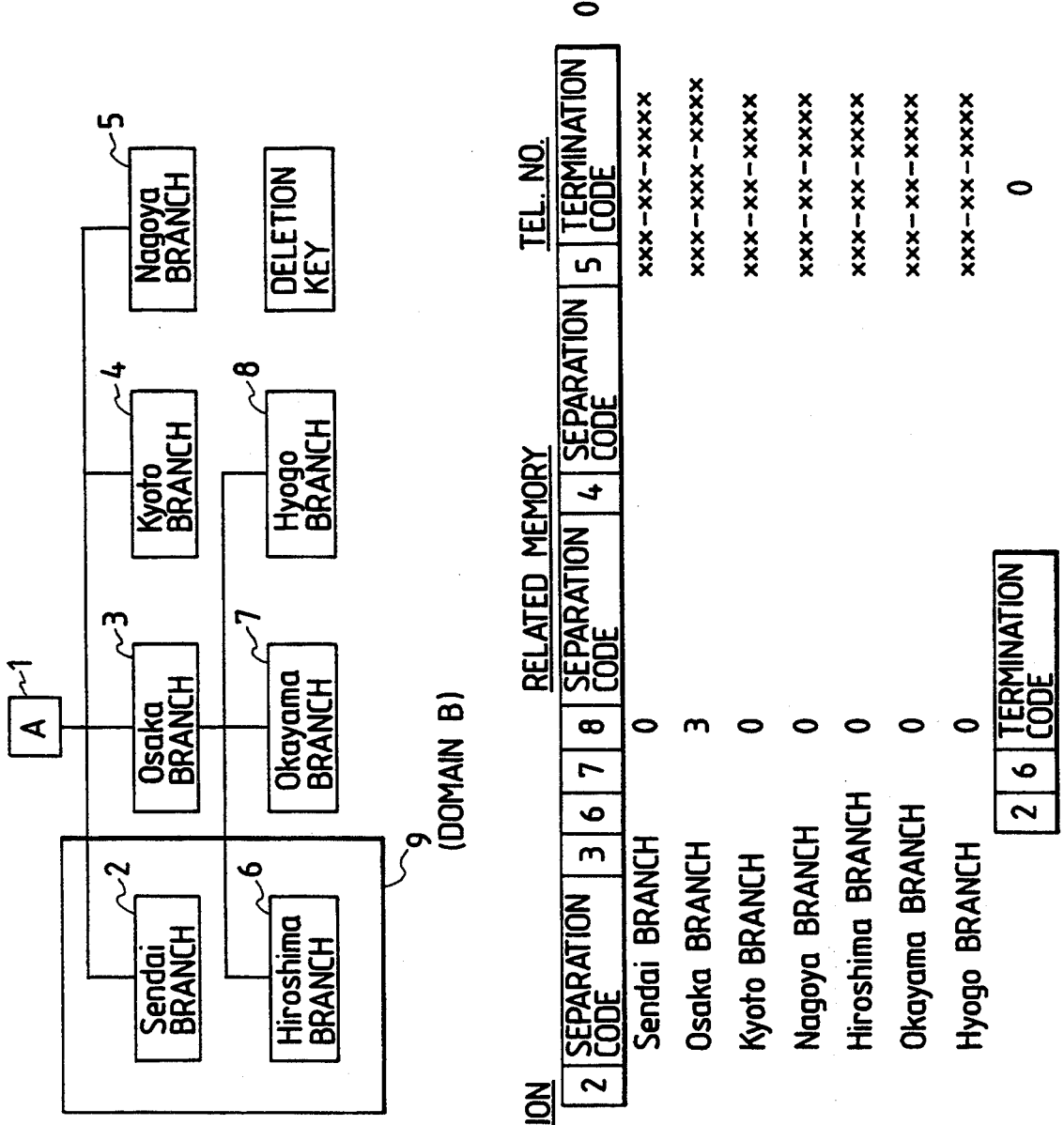
FIG. 25 is a data table for the eighth embodiment of the present invention.

FIG. 25 is a conceptual diagram of the data held in back-up memory 11 of the coordinate input device 10, and FIG. 26 is a flow chart explaining the function of the coordinate input device controller 12.

This eighth embodiment of the present invention will be explained with reference to FIG. 26.

At step S1, a decision is taken as to whether or not key A in FIG. 24 is on. When this is positive, a decision is taken as to whether or not the deletion key is on (step S2). Where this is negative, the process moves on to step S1 of FIG. 10, and the operation of transmission to all terminal stations 2-8 is carried out.

At the same time, where the decision of step S2 is positive, a decision is taken as to whether or not key B is on (step S3), and when positive, the process moves on to step S4. At step S4, a search is carried out for the keys included in domain B. Specifically, the operation explained in FIG. 22 is carried out.

When the procedure of step S4 is terminated, the process moves on to step S1 in FIG. 10, and the operation of FIG. 10 is sequentially executed. However, although it is necessary to add in to FIG. 10 an operation to remove transmission to the terminal stations found in step S4, the addition of this operation is a procedure that can be easily carried out by those having ordinary skill in the relevant art, and its explanation will be omitted.

For all the above embodiments explanation has been given for the case where manuscript information is transmitted, but the invention is not limited to this, and it is of course the case that other functions may be expressed in an organizational chart. In such a case, for example as shown in FIG. 18, each function will be registered in the functional memory, and when executing the key number functions will be read out from the functional memory and executed.

As explained above, according to the invention, as a series of cell destinations and a variety of functions can be input from an organizational chart depicted on coordinate input device 10 (see FIG. 1) or depicted on a sheet or the like placed down on it, input is both easy and accurate for the user.

The foregoing description of preferred embodiment(s) of the invention has been presented for purposes of illustration and description. It is not intended to be exhaustive or to limit the invention to the precise form disclosed, and modifications and variations are possible in light of the above teachings or may be acquired from practice of the invention. The embodiment(s) were (was) chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An indication input system, comprising:
   coordinate input means for displaying an organizational chart expressing the relationship of a plurality of functions, and for registering coordinates of a point when indicated on said organizational chart;
   a memory for storing a data table including said plurality of functions, a plurality of key domains defining a coordinate boundary of each of said plurality of functions, key numbers which uniquely identify each of said key domains, and related data defining the relationship between said plurality of functions as expressed on said organizational chart, said related data including the key numbers which identify the key domains related to each of said functions; and
   control means for determining selected functions in accordance with a point indicated on said coordinate input means, and for sequentially effecting the execution of the selected functions and any of the plurality of functions related to said selected functions by first reading the key number identifying one of said selected functions, executing said one selected function, reading the related data of said one selected function, sequentially executing any function whose key number is read, and repeating the above procedure for the remaining selected functions.

2. An indication input system, comprising:

coordinate input means for displaying an organizational chart expressing the relationship of a plurality of functions, and for registering coordinates of a point when indicated on said organizational chart;

a memory for storing a data table including said plurality of functions, a plurality of key domains defining a coordinate boundary of each of said plurality of functions, said plurality of key domains including at least one key domain which defines a coordinate boundary for indication of more than one of said plurality of functions, and related data defining the relationship between said plurality of functions as expressed on said organizational chart; and control means for determining selected functions in accordance with a point indicated on said coordinate input means, and for sequentially effecting the execution of the selected functions and any of the plurality of functions related to said selected functions.

3. The system of claim 2, wherein said coordinate boundary for indication of more than one of said plurality of functions is exclusive of the coordinate boundaries of each one of said plurality of functions indicated thereby.

4. The system of claim 2, wherein said coordinate boundary for indication of more than one of said plurality of functions is inclusive of the coordinate boundaries of the functions indicated thereby.

5. The system of claim 2, wherein said coordinate boundary for indication of more than one of said plurality of functions includes only the area common to the coordinate boundaries of the functions indicated thereby.

6. The system of claim 2, wherein said data table further includes key numbers which uniquely identify each of said key domains.

7. The system of claim 6, wherein said related data included in said data table includes the key numbers which identify the key domains related to each of said functions.

8. The system of claim 7, wherein said control means sequentially effects the execution of said selected functions and the functions related to said selected functions by first reading the key number identifying one of said selected functions, executing said one selected function, reading the related data of said one selected function, sequentially executing any function whose key number is read, and repeating the above procedure for the remaining selected functions.

9. An indication input system, comprising:

coordinate input means for displaying an organizational chart expressing the relationship of a plurality of functions, and for registering coordinates of a point when indicated on said organizational chart;

a memory for storing a data table including said plurality of functions, a plurality of key domains defining a coordinate boundary of each of said plurality of functions, said plurality of key domains including the coordinate boundaries of at least two of said plurality of functions with an area common to one another, and related data defining the relationship between said plurality of functions as expressed on said organizational chart; and control means for determining selected functions in accordance with a point indicated on said coordinate input means, and for sequentially effecting the execution of the selected functions and any of the plurality of functions related to said selected functions.

10. An indication input system, comprising:

coordinate input means for displaying an organizational chart expressing the relationship of a plurality of functions, and for registering coordinates of a point when indicated on said organizational chart;

a memory for storing a data table including said plurality of functions, a plurality of key domains defining a coordinate boundary of each of said plurality of functions, a plurality of key domains defining a coordinate boundary for indication of more than one of said plurality of functions, and related data defining the relationship between said plurality of functions as expressed on said organizational chart; and control means for determining selected functions in accordance with a point indicated on said coordinate input means, and for sequentially effecting the execution of the selected functions and any of the plurality of functions related to said selected functions.

11. The system of claim 10, wherein said coordinate boundary for indication of more than one of said plurality of functions is exclusive of the coordinate boundaries of each one of said plurality of functions indicated thereby.

12. The system of claim 10, wherein said coordinate boundary for indication of more than one of said plurality of functions is inclusive of the coordinate boundaries of the functions indicated thereby.

13. The system of claim 10, wherein said coordinate boundary for indication of more than one of said plurality of functions includes only the area common to the coordinate boundaries of the functions indicated thereby.

14. The system of claim 10, wherein said data table further includes key numbers which uniquely identify each of said key domains.

15. The system of claim 14, wherein said related data included in said data table includes the key numbers which identify the key domains related to each of said functions.

16. The system of claim 15, wherein said control means sequentially effects the execution of said selected functions and the functions related to said selected functions by first reading the key number identifying one of said selected functions, executing said one selected function, reading the related data of said one selected function, sequentially executing any function whose key number is read, and repeating the above procedure for the remaining selected functions.

17. An indication input system, comprising:

coordinate input means for displaying an organizational chart expressing the relationship of a plurality of functions, including destinations for information to be transmitted via a facsimile apparatus, and for registering coordinates of a point when indicated on said organizational chart;

a memory for storing a data table including said plurality of functions, a plurality of key domains defining a coordinate boundary of each of said plurality of functions, and related data defining the relationship between said plurality of functions as expressed on said organizational chart; and control means for determining selected functions in accordance with a point indicated on said coordinate input means, and for sequentially effecting the execution of the selected functions and any of the plurality of functions related to said selected functions.

18. An indication input system, comprising:

coordinate input means for displaying an organizational chart expressing the relationship of a plurality of functions, including a transmit function to be carried out by a facsimile apparatus, and for registering coordinates of a point when indicated on said organizational chart;

a memory for storing a data table including said plurality of functions, a plurality of key domains defining a coordinate boundary of each of said plurality of functions, and related data defining the relationship between said plurality of functions as expressed on said organizational chart; and control means for determining selected functions in accordance with a point indicated on said coordinate input means, and for sequentially effecting the execution of the selected functions and any of the plurality of functions related to said selected functions.

19. An indication input system, comprising:

coordinate input means for displaying an organizational chart expressing the relationship of a plurality of functions, including a receive function to be carried out by a facsimile apparatus, and for registering coordinates of a point when indicated on said organizational chart;

a memory for storing a data table including said plurality of functions, a plurality of key domains defining a coordinate boundary of each of said plurality of functions, and related data defining the relationship between said plurality of functions as expressed on said organizational chart; and control means for determining selected functions in accordance with a point indicated on said coordinate input means, and for sequentially effecting the execution of the selected functions and any of the plurality of functions related to said selected functions.

20. An indication input system, comprising:

coordinate input means for displaying an organizational chart expressing the relationship of a plurality of functions, including a copy function to be carried out by a facsimile apparatus, and for registering coordinates of a point when indicated on said organizational chart;

a memory for storing a data table including said plurality of functions, a plurality of key domains defining a coordinate boundary of each of said plurality of functions, and related data defining the relationship between said plurality of functions as expressed on said organizational chart; and control means for determining selected functions in accordance with a point indicated on said coordinate input means, and for sequentially effecting the execution of the selected functions and any of the plurality of functions related to said selected functions.

21. A facsimile apparatus, comprising:

coordinate input means for displaying an organizational chart expressing the relationship of a plurality of destinations, and for registering coordinates of a point when indicated on said organizational chart;

a memory for storing a data table including telephone numbers of said plurality of destinations, a plurality of key domains which define a coordinate boundary of each destination, and related data defining the relationship between said plurality of destinations as expressed on said organizational chart; and control means for determining selected destinations in accordance with a point indicated on said coordinate input means, and for sequentially effecting the transmission of information to the selected destinations and any of the plurality of destinations related to said selected destinations.

22. The facsimile apparatus of claim 21, wherein said control means determines which destinations have been selected by determining which of said plurality of key domains said indicated point is located within.

23. The facsimile apparatus of claim 21, wherein said data table further includes key numbers which uniquely identify each of said key domains.

24. The facsimile apparatus of claim 23, wherein said related data included in said data table includes the key numbers which identify the key domains related to each of said destinations.

25. The facsimile apparatus of claim 24, wherein said control means sequentially effects the transmission of information to said selected destinations and the destinations related to said selected destinations by first reading the key number identifying one of said selected destinations, transmitting said information to said one selected destination, reading the related data of said one selected destination, sequentially transmitting said information to any destination whose key number is read, and repeating the above procedure for the remaining selected destinations.

26. The facsimile apparatus of claim 21, wherein said data table further includes at least one key domain which defines a coordinate boundary for indication of more than one of said plurality of destinations.

27. The facsimile apparatus of claim 26, wherein said coordinate boundary for indication of more than one of said plurality of destinations is exclusive of the coordinate boundaries of each one of said plurality of destinations indicated thereby.

28. The facsimile apparatus of claim 26, wherein said coordinate boundary for indication of more than one of said plurality of destinations is inclusive of the coordinate boundaries of the destinations indicated thereby.

29. The facsimile apparatus of claim 26, wherein said coordinate boundary for indication of more than one of said plurality of destinations includes only the area common to the coordinate boundaries of the destinations indicated thereby.

30. The facsimile apparatus of claim 26, wherein said data table further includes key numbers which uniquely identify each of said key domains.

31. The facsimile apparatus of claim 30, wherein said related data included in said data table includes the key numbers which identify the key domains related to each of said destinations.

32. The facsimile apparatus of claim 31, wherein said control means sequentially effects the transmission of information to said selected destinations and the destinations related to said selected destinations by first reading the key number identifying one of said selected destinations, transmitting said information to said one selected destination, reading the related data of said one selected destination, sequentially transmitting said information to any destination whose key number is read, and repeating the above procedure for the remaining selected destinations.

33. The facsimile apparatus of claim 21, wherein the coordinate boundaries of each destination are exclusive of one another.

34. The facsimile apparatus of claim 21, wherein at least two of the coordinate boundaries of each destination have an area common to one another.

35. The facsimile apparatus of claim 21, wherein said data table further includes a plurality of key domains each of which defines a coordinate boundary for indication of more than one of said plurality of destinations.

36. The facsimile apparatus of claim 35, wherein said coordinate boundary for indication of more than one of said plurality of destinations is exclusive of the coordinate boundaries of each one of said plurality of destinations indicated thereby.

37. The facsimile apparatus of claim 35, wherein said coordinate boundary for indication of more than one of said plurality of destinations is inclusive of the coordinate boundaries of the destinations indicated thereby.

38. The facsimile apparatus of claim 35, wherein said coordinate boundary for indication of more than one of said plurality of destinations includes only the area common to the coordinate boundaries of the destinations indicated thereby.

39. The facsimile apparatus of claim 35, wherein said data table further includes key numbers which uniquely identify each of said key domains.

40. The facsimile apparatus of claim 39, wherein said related data included in said data table includes the key numbers which identify the key domains related to each of said destinations.

41. The facsimile apparatus of claim 40, wherein said control means sequentially effects the transmission of information to said selected destinations and the destinations related to said selected destinations by first reading the key number identifying one of said selected destinations, transmitting said information to said one selected destination, reading the related data of said one selected destination, sequentially transmitting said information to any destination whose key number is read, and repeating the above procedure for the remaining selected destinations.

* * * * *